United States Patent [19]

Schmidt

[11] 4,156,317

[45] May 29, 1979

[54] DREDGE SWINGING SYSTEM

[76] Inventor: Frederick J. Schmidt, 5208 N. Marietta Dr., Mobile, Ala. 36618

[21] Appl. No.: 891,661

[22] Filed: Mar. 30, 1978

[51] Int. Cl.² ............................................. E02F 3/88
[52] U.S. Cl. .................... 37/54; 37/DIG. 1; 318/626
[58] Field of Search ...................... 37/DIG. 19, 54, 58, 37/64–67, DIG. 1; 318/626, 627, 282

[56] References Cited

U.S. PATENT DOCUMENTS

| 890,470 | 6/1908 | Taft et al. ........................ 37/DIG. 19 |
| 1,792,065 | 2/1931 | Bowers .................................... 37/67 |
| 2,461,311 | 2/1949 | Cushing et al. .................. 37/58 UX |
| 3,471,949 | 10/1969 | Cargile, Jr. ............................... 37/64 |

FOREIGN PATENT DOCUMENTS

| 1280162 | 10/1968 | Fed. Rep. of Germany ............. 37/67 |
| 207812 | 2/1968 | U.S.S.R. ..................................... 37/58 |
| 242761 | 9/1969 | U.S.S.R. ..................................... 37/67 |
| 244218 | 10/1969 | U.S.S.R. ..................................... 37/67 |

Primary Examiner—Clifford D. Crowder
Attorney, Agent, or Firm—Thomas O. Maser

[57] ABSTRACT

A dredge swinging system for automatically swinging a dredge in a leftward and rightward direction a predetermined degree in response to the equalization of electronic compass output signals representative of the position of a dredge and electronic memory output signals representative of the degree to which it is desired that the dredge be swung.

10 Claims, 1 Drawing Figure

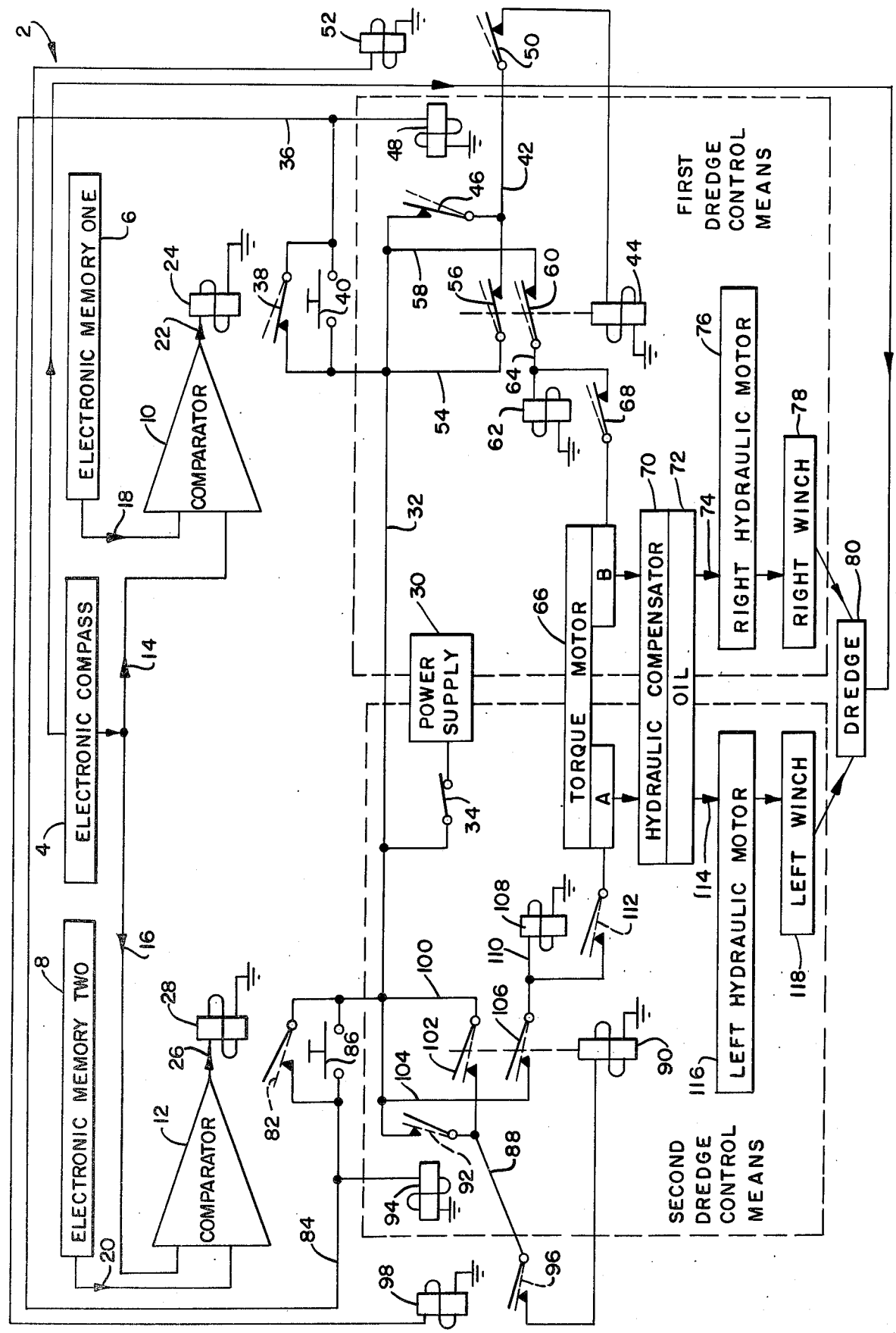

DREDGE SWINGING SYSTEM

The invention described herein may be manufactured, used, and licensed by or for the Government for Governmental purposes without the payment to me of any royalties thereon.

BACKGROUND OF THE INVENTION

The invention is directed to a system for automatically swinging a dredge in a rightward or leftward direction a predetermined degree.

In such a system several problems are apparent. An example of one of the problems is that it is desirable to prevent the dredge from swinging in a given direction beyond the predetermined limit. This is necessary to prevent possible damage to any of the components of the system caused by the dredge swinging beyond the desired limit. It is also necessary in order to assure precise location of the dredge at the outer limits of its swing. Another problem is that in a fully automated system it is desirable to provide means for causing the automatic reversal of direction in which a dredge is swung when it reaches such predetermined limit. Such reversal of direction should be effected without having the dredge swing beyond such limit and without requiring the dredge operator to activate additional components unless manual operation is desired. A further problem is to deactivate those components used for leftward (rightward) movement of the dredge during the period when it is swinging rightward (leftward), without adversely affecting such rightward (leftward) movement. Such deactivation must be timely in order to assure that the predetermined limit of swing in one direction is reached before swing in the other direction begins.

Accordingly, it is an object of this invention to provide a system for automatically swinging a dredge in a rightward or leftward direction in such a manner as to prevent the dredge from swinging in either of said directions beyond a predetermined limit.

Another object of this invention is to provide a system for swinging a dredge which effects precise location of the dredge when it reaches the predetermined limit of its swing in a given direction.

Still another object of this invention is to provide a system for swinging a dredge which is fully automated and which effects the automatic reversal of direction in which the dredge is swung when it reaches a predetermined limit.

A further object of this invention is to provide a system for selectively swinging a dredge in a rightward or leftward direction a predetermined degree which is fully automated but which may be operated manually, if desired.

Still a further object of this invention is to provide a system for swinging a dredge in a rightward or leftward direction a predetermined degree wherein those components used for leftward movement are deactivated during the period when the dredge is swinging rightward, and those components used for rightward movement are deactivated during the period when the dredge is swinging leftward, without adversely affecting said rightward or leftward swinging, respectively.

SUMMARY OF THE INVENTION

This invention achieves these and other objects by providing a system, for swinging a dredge in a rightward or leftward direction a predetermined degree, which comprises a first and second comparator, and an electronic compass connected to a dredge and coupled to the comparators for generating compass output signals to the comparators representative of the position of the dredge. A first electronic memory is coupled to the first comparator and is programmed to identify a predetermined degree to which it is desired that the dredge be swung in a leftward direction and to generate memory output signals representative thereof. A second electronic memory is coupled to the second comparator and is programmed to identify a predetermined degree to which it is desired that the dredge be swung in a rightward direction and to generate memory output signals representative thereof. A first relay is coupled to the first comparator. The contact of the first relay is automatically closed only when receiving output signals from the first comparator, such first comparator output signals being emitted from the point in time when the compass output signals equal the first memory output signals and until such time as the compass output signals equal the second memory output signals. Similarly, a second relay is coupled to the second comparator. The contact of the second relay is automatically closed only when receiving output signals from the second comparator, such second comparator output signals being emitted from the point in time when the compass output signals equal the second memory output signals and until such time as the compass output signals equal the first memory output signals. A first dredge control means is coupled between the first relay and the dredge and causes the dredge to swing to the right when the contact of the first relay is closed. Similarly, a second dredge control means is coupled between the second relay and the dredge and causes the dredge to swing to the left when the contact of the second relay is closed. Preferably, the system includes a normally closed third relay, coupled between the first relay and the second dredge control means, the contact of which is opened when the first relay contact is closed thereby deactivating the second dredge control means. Also preferably provided is a normally closed fourth relay, coupled between the second relay and the first dredge control means, the contact of which is opened when the second relay control is closed thereby deactivating the first dredge control means.

DESCRIPTION OF DRAWING

This invention may be clearly understood by reference to the attached drawing which is a schematic view of one embodiment of the system for swinging a dredge of the present invention.

DESCRIPTION OF PREFERRED EMBODIMENT

The embodiment of this invention which is schematically illustrated in the drawing is one which is particularly suited for achieving the objects of this invention. The drawing depicts the dredge swinging system 2 of the present invention. The system 2 comprises an electronic compass 4, first electronic memory 6, second electronic memory 8, and comparators 10 and 12. Electronic compass 4 is connected to the dredge and coupled to the comparators. Compass 4 generates output signals 14 which represent the leftward position of the dredge and output signals 16 which represent the rightward position of the dredge. Such compass reading indicates the rightward or leftward position of the dredge. Signals 14 and 16 are emitted from the compass to comparators 10 and 12, respectively, thereby providing the reference for the swinging of the dredge. Any prior art electronic compass capable of generating such signals may be used for this purpose. Each electronic memory 6 and 8 is coupled to comparators 10 and 12, respectively, and is preferably of the type which may be programmed by keyboard. Utilization is made of such keyboard to program the memory regarding the degree to which it is desired that the dredge swing in a given direction. For example, electronic memory 6 may be programmed to identify the degree or reading to which it is desired that the dredge be swung to the left. Similarly, electronic memory 8 may be programmed to identify the degree or reading to which it is desired that the dredge be swung to the right. In operation, electronic memory 6 generates output signals 18 representative of the left swing reading, initially programmed, to comparator 10. Similarly, electronic memory 8 generates output signals 20 representative of the right swing reading, initially programmed, to comparator 12.

Comparator 10 assimilates signals 14 and 18 and generates an output signal 22 when the compass reading (signal 14) is equal to the reading previously programmed into memory 6 (signal 18). The output 22 is coupled to a first relay 24 and energizes its coil when such equalization is effected.

Comparator 12 assimilates signals 16 and 20 and generates an output signal 26 when the compass reading (signal 16) is equal to the reading previously programmed into memory 8 (signal 20). The output 26 is coupled to a second relay 28 and energizes its coil when such equalization is effected.

Before describing the circuitry depicted in the drawing, it should be noted that the various contacts are shown as being open or closed by solid or dashed arms. The solid contact arms represent the state of the circuitry when the coil of relay 24 has been energized and the coil of relay 28 has been de-energized. The dashed contact arms represent the state of the circuitry when the coil of relay 28 has been energized and the coil of relay 24 has been de-energized.

The drawing depicts a first dredge control means comprising a power supply, a first plurality of relays coupled to the first relay 24, a torque motor, a hydraulic compensator and a right hydraulic motor and winch. For example, power supply 30 is coupled to connector 32 through switch 34. Contact 38, associated with relay 24, is coupled to connectors 32 and 36. Conductor 42 is coupled to conductor 32 and to relay 44 through contact 46 of relay 48 and a normally closed contact 50 of relay 52. Relay 48 is coupled to conductor 36. Conductor 54 is coupled to conductor 32, and conductor 42 through contact 56 of relay 44. Conductor 58 is coupled to conductor 32, and to contact 60 of relay 44. A first time delay closing relay 62 is coupled to contact 60 through connector 64. Electromagnet B of the torque motor 66 is coupled to the first plurality of relays through contact 68 of relay 62. Contact 68 is coupled to conductor 64. The torque motor 66, through electromagnet B, is also coupled to a hydraulic compensator 70 and causes the compensator to move to the left when power is applied to energize electromagnet B. Such leftward movement couples oil supply 72 under pressure through left conduit 74 to the right hydraulic motor 76 to operate right winch 78, operatively connected between the motor 76 and dredge 80, to cause the dredge 80 to swing to the right.

A second dredge control means exists for moving the dredge to the left and comprises a power supply, a second plurality of relays coupled to the second relay 28, a torque motor, a hydraulic compensator and a left hydraulic motor and winch. For example, as noted, power supply 30 is coupled to connector 32 through switch 34. Contact 82, associated with relay 28, is coupled to connectors 32 and 84. Conductor 88 is coupled to conductor 32 and to relay 90 through contact 92 of relay 94 and a normally closed contact 96 of relay 98. Relay 94 is coupled to conductor 84. Conductor 100 is coupled to conductor 32, and conductor 88 through contact 102 of relay 90. Conductor 104 is coupled to conductor 32, and to contact 106 of relay 90. A second time delay closing relay 108 is coupled to contact 106 through conductor 110. Electromagnet A of the torque motor 66 is coupled to the second plurality of relays through contact 112 of relay 108. Contact 112 is coupled to conductor 110. The torque motor 66, through electromagnet A, is also coupled to hydraulic compensator 70 and causes the compensator to move to the right when power is applied to energize electromagnet A. Such rightward movement couples oil supply 72 under pressure through right conduit 114 to the left hydraulic motor 116 to operate left winch 118, operatively connected between the motor 116 and dredge 80, to cause the dredge 80 to swing to the left.

Normally closed third relay 98 is coupled to the first relay 24 through conductor 36 and to the second dredge control means through contact 96 of relay 98. Normally closed fourth relay 52 is coupled to the second relay 28 through conductor 84 and to the first dredge control means through contact 50 of relay 52.

A first momentary contact switch 40 is coupled between the first relay 24 and the first dredge control means by coupling switch 40 to conductors 32 and 36. Similarly, second momentary contact switch 86 is coupled between the second relay 28 and the second dredge control means by coupling switch 86 to conductors 32 and 84.

In the operation of the embodiment shown in the drawing, the dredge operator presses switch 86 to swing the dredge to the left the desired degree, and the leftward compass reading is then programmed into memory 6. Then the switch 40 is pressed to swing the dredge to the right the desired degree and the rightward compass reading is then programmed into memory 8. At this point switch 82 is closed to control that portion of the circuit depicted in the drawing allowing for leftward movement, as described in greater detail below. When the dredge has been swung to the left to the desired degree; that is, at such point where the compass reading (signal 14) is equal to the reading stored in memory 6 (signal 18), the comparator 10 energizes the coil of relay 24 to close its contact 38. Similarly, comparator 12 de-energizes the coil of relay 28 and thereby causes its contact 82 to assume an open position. The closing of the circuit at contact 38 causes the coils of relays 48 and 98 to be energized. The energization of the coil of relay 98 opens normally closed contact 98 which thereby allows for the deactivation of electromagnet A. The opening of contact 82 de-energizes the coil of relay 52 so that its normally closed contact 50 assumes its normally closed position.

The energization of the coil of relay 48 and the closing of contact 50 provide for rightward swinging of the dredge. As depicted in the drawing, the energization of the coil of relay 48 closes its contact 46. Since contact 50 is in its normally closed position, the circuit is complete and the coil of relay 44 is energized. Such energization of the coil of relay 44 causes it contacts 56 and 60 to close. The closing of contact 56 completes the circuit around contact 46 to provide continuous activation of the coil of relay 44 until such time as the compass reading (signal 16) is equal to the reading held in memory 8 (signal 20) or switch 34 is opened removing power from all relays. The closing of contact 60 completes the circuit to the coil of relay 62 allowing the coil of relay 62 to be energized and its contact 68 to be thereby closed. Since relays 62 and 108 are time delay closing relays, a time lapse of a few seconds is provided to allow the dredge to reach the end of the leftward swing before the swing to the right begins. At the end of the leftward swing of the dredge, further movement in that direction is prevented since electromagnet A has been deactivated. However, rightward movement is effected since the closing of contact 68 allows power to be applied to energize electromagnet B of the torque motor 66. Electromagnet B causes hydraulic compensator 70 to move to the left to provide the proper oil flow from oil supply 72 through conduit 74 to right hydraulic motor 76 which activates the right winch 78 to move dredge 80 to the right until such time as the compass reading (signal 16) is equal to the reading stored in memory 8 (signal 20).

When signal 16 is equal to signal 20, the comparator 12 causes the energization of the coil of relay 28 which closes contact 82. Similarly, comparator 10 de-energizes the coil of relay 24 and thereby causes contact 38 to assume an open position. The closing of the circuit at contact 82 causes the coils of relays 94 and 52 to be energized. The energization of the coil of relay 52 opens its normally closed contact 50 which thereby allows for the deactivation of electromagnet B. The opening of contact 38 de-energizes the coil of relay 98 so that its normally closed contact 96 assumes its normally closed position.

The energization of the coil of relay 94 and the closing of contact 96 provide for leftward swinging of the dredge. As depicted in the drawing, the energization of the coil of relay 94 closes its contact 92. Since contact 96 is in its normally closed position, the circuit is complete and the coil of relay 90 is energized. Such energization of the coil of relay 90 causes its contacts 102 and 106 to close. The closing of contact 102 completes the circuit around contact 92 to provide continuous activation of the coil of relay 90 until such time as the compass reading (signal 14) is equal to the reading held in memory 6 (signal 18) or switch 34 is opened removing power from all relays. The closing of contact 106 completes the circuit to relay 108 allowing the coil of relay 108 to be energized and its contact 112 to be thereby closed. Since, as noted, relays 62 and 108 are time delay closing relays, a time lapse of a few seconds is provided to allow the dredge to reach the end of the rightward swing before the swing to the left begins. At the end of the rightward swing of the dredge, further movement in that direction is presented since electromagnet B has been deactivated. However, leftward movement is effected since the closing of contact 112 allows power to be applied to electromagnet A of torque motor 66. Such energization of electromagnet A causes hydraulic compensator 70 to move to the right to provide the proper oil flow from oil supply 72 through conduit 114 to left hydraulic motor 116 which activates the left winch 118 to move dredge 80 to the left until such time as the compass reading (signal 14) is equal to the reading stored in memory 6 (signal 18) at which time the coil of relay 24 is energized to close contact 38 and the coil of relay 28 is de-energized to cause contact 82 to assume an open position as described above.

At any time in the cycle the swing of the dredge can be stopped by opening switch 34 thereby removing power from all relays.

Referring to the drawing, it will be noted that by pushing second momentary contact switch 86 the circuit, previously described as being closed by contact 82 upon energization of the coil of relay 28, may be manually closed and have the same affect as the closing of contact 82 has upon the leftward swinging of the dredge as described above. Similarly, the pushing of first momentary contact switch 40 closes the circuit, previously described as being closed by contact 38 upon energization of relay 24, and has the same affect as the closing of contact 38 has upon the rightward swinging of the dredge as described above.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A dredge swinging system comprising:
a dredge;
a first and second comparator;
an electronic compass connected to said dredge and coupled to said comparators for generating compass output signals to said comparators representative of the position of said dredge;
a first electronic memory coupled to said first comparator, said first memory being programmed to identify a predetermined degree to which it is desired that said dredge be swung in a leftward direction and to generate memory output signals representative thereof;
a second electronic memory coupled to said second comparator, said second memory being programmed to identify a predetermined degree to which it is desired that said dredge be swung in a rightward direction and to generate memory output signals representative thereof;
a first relay, coupled to said first comparator, the contact of which is automatically closed only when receiving output signals from said first comparator, said first comparator output signals being emitted from the point in time when said compass output signals equal said first memory output signals until such time as said compass output signals equal said second memory output signals;
a second relay, coupled to said second comparator, the contact of which is automatically closed only when receiving output signals from said second comparator, said second comparator output signals being emitted from the point in time when said compass output signals equal said second memory output signals until such time as said compass output signals equal said first memory output signals;
a first dredge control means coupled between said first relay and said dredge for causing said dredge to swing to the right when said first relay contact is closed; and,
a second dredge control means coupled between said second relay and said dredge for causing said dredge to swing to the left when said second relay contact is closed.

2. The system of claim 1 including a normally closed third relay, coupled between said first relay and said second dredge control means, the contact of which is opened when said first relay contact is closed thereby deactivating said second dredge control means; and, a normally closed fourth relay, coupled between said second relay and said first dredge control means, the contact of which is opened when said second relay contact is closed thereby deactivating said first dredge control means.

3. The system of claim 1 wherein said first dredge control means comprises a first plurality of relays, coupled to said first relay, which are energized to close each their respective contacts when said first relay contact is closed, and said second dredge control means comprises a second plurality of relays, coupled to said second relay, which are energized to close each of their respective contacts when said second relay contact is closed.

4. The system of claim 3 wherein said first and second dredge control means further comprise a torque motor having a first electromagnet, coupled to said first plurality of relays, which is energized when said first plurality of relays is energized, and a second electromagnet, coupled to said second plurality of relays, which is energized when said second plurality of relays is energized.

5. The system of claim 4 including a hydraulic compensator, in combination with an oil supply under pressure having left and right conduits, connected to said torque motor, said compensator moving to the left to allow oil under pressure to flow through said left conduit when said first electromagnet is energized, and to the right to allow oil under pressure to flow through said right conduit when said second electromagnet is energized.

6. The system of claim 5 including a left hydraulic motor operatively connected to said right conduit and a right hydraulic motor operatively connected to said left conduit.

7. The system of claim 6 wherein a left winch is operatively connected between said left motor and said dredge, and a right which is operatively connected between said right motor and said dredge.

8. The system of claim 3 wherein said first and second dredge control means include a power supply and a switch between said power supply and each of said plurality of relays.

9. The system of claim 3 wherein said first plurality of relays includes a first time delay closing relay and said first electromagnet is coupled thereto, and said second plurality of relays includes a second time delay closing relay and said second electromagnet is coupled thereto.

10. The system of claim 1 wherein a first momentary contact switch is coupled between said first relay and said first dredge control means, and a second momentary contact switch is coupled between said second relay and said second dredge control means.

* * * * *